Dec. 16, 1941.  S. L. TOLMAN  2,266,097
METHOD OF AND APPARATUS FOR CLARIFYING LIQUIDS
Filed March 11, 1938   3 Sheets-Sheet 3
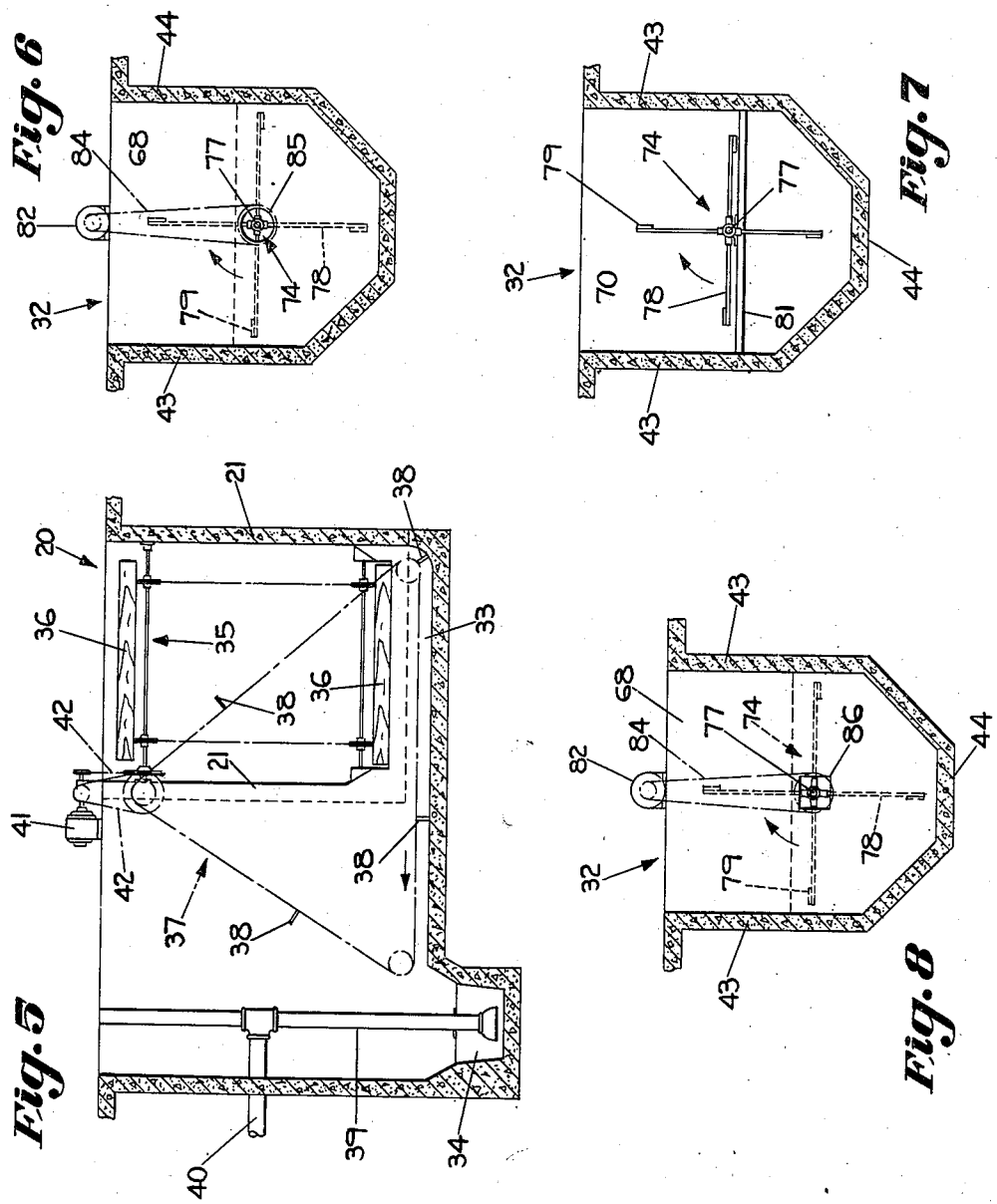
INVENTOR:
SAMUEL L. TOLMAN,
BY
Chas. M. Nissen,
ATTY.

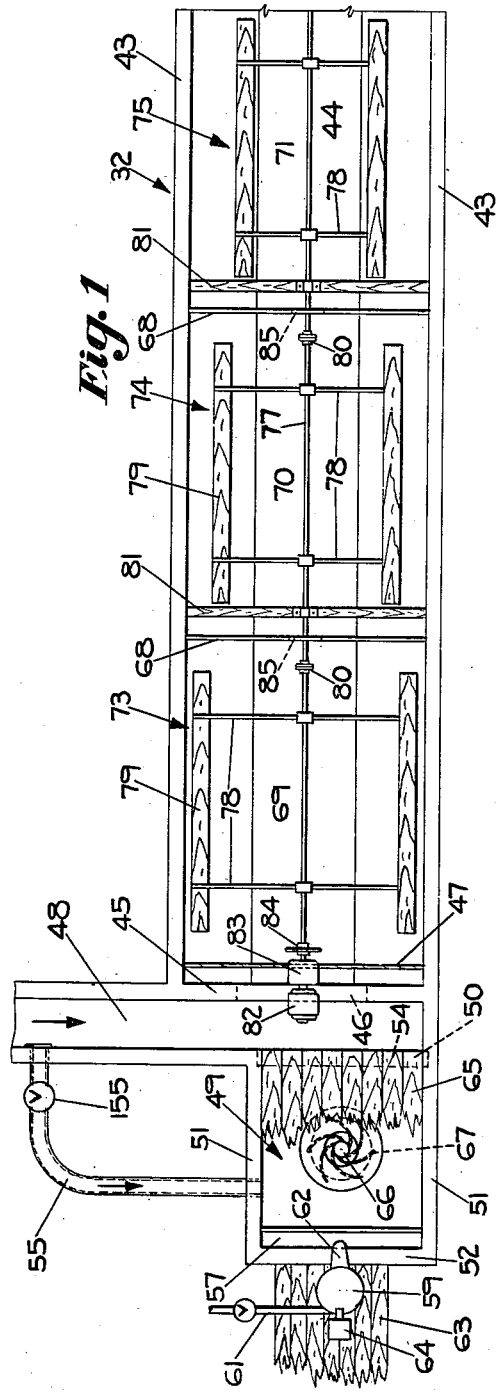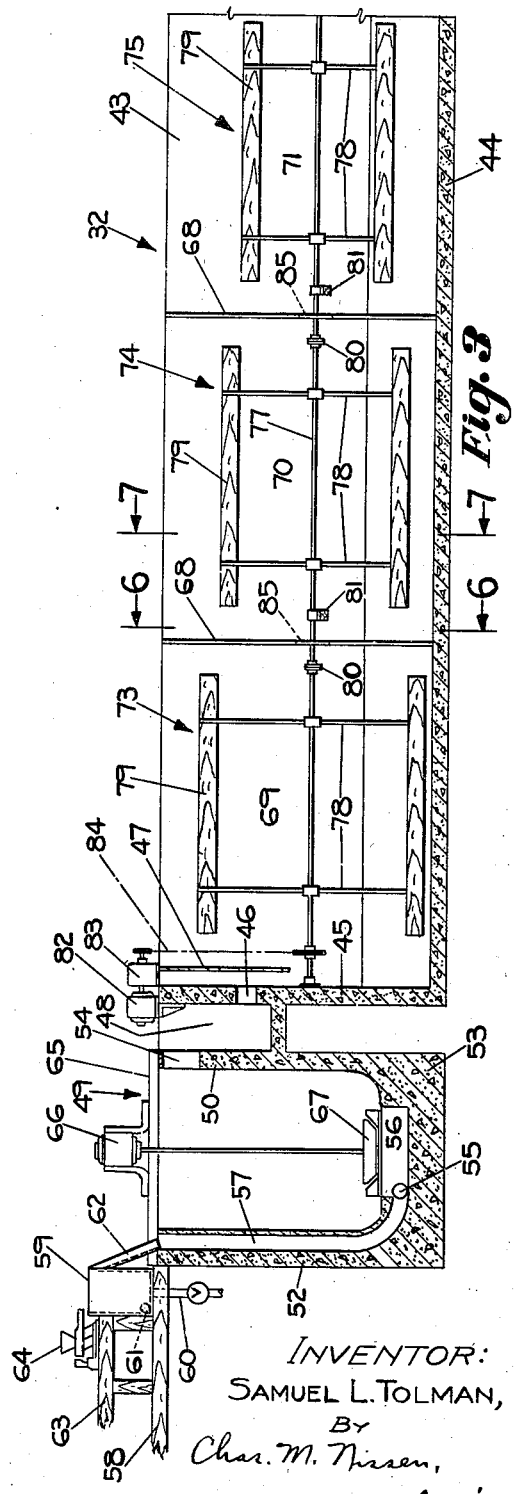

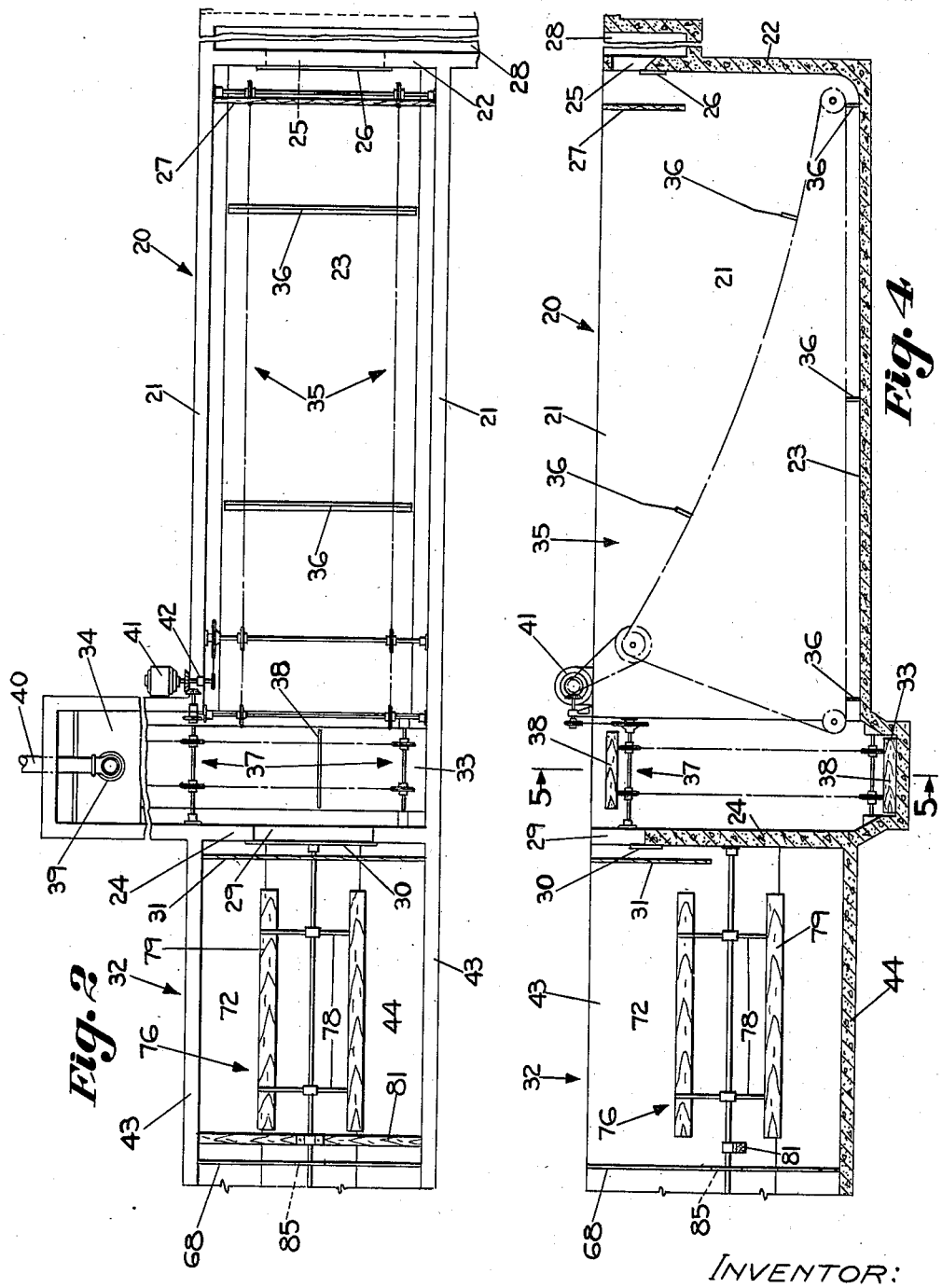

Patented Dec. 16, 1941

2,266,097

UNITED STATES PATENT OFFICE 2,266,097

METHOD OF AND APPARATUS FOR CLARIFYING LIQUIDS

Samuel L. Tolman, Columbus, Ohio, assignor to The Jeffrey Manufacturing Company, a corporation of Ohio Application March 11, 1938, Serial No. 195,340

4 Claims. (Cl. 259—68)

This invention relates to a method of and apparatus for clarifying liquids and particularly for removing suspended solids found in liquid, such as city water supplies, sewage and industrial wastes, by forming the suspended solids into flocks by a flocculating action and then allowing the flocculated solids to settle in a settling tank or compartment.

An object of the invention is to provide an efficient and economical use of chemicals to produce settling of suspended solids in liquids in a minimum of time.

Another object of the invention is to maintain all the liquid in the flocculating compartments the necessary length of time while reducing to a minimum the size of said compartments for any given capacity.

Other objects of the invention will appear hereinafter, the novel features and combinations being set forth in the appended claims.

In the accompanying drawings,

Figs. 1 and 2, placed end to end, show apparatus comprising my invention which is capable of carrying out the method of my invention;

Figs. 3 and 4, placed end to end, comprise a longitudinal vertical sectional view of the apparatus of Figs. 1 and 2;

Fig. 5 is a sectional view taken on the line 5—5 of Fig. 4 looking in the direction of the arrows;

Figs. 6 and 7 are transverse sectional views taken on the lines 6—6 and 7—7, respectively, of Fig. 3 of the drawings; and Fig. 8 is a view similar to Fig. 6 showing a modified form of opening between successive compartments of the flocculator.

Referring particularly to Figs. 1 to 7, inclusive, of the drawings, there is illustrated apparatus comprising my invention which embodies one means for carrying out the method of my invention. Said apparatus comprises a settling or sedimentation tank 20 comprising side walls 21, 21, rear end wall 22, bottom 23 and front wall 24, all of which are formed as a monolith of poured concrete. The end wall 22 is provided with an effluent opening 25 with which is associated an adjustable weir 26 and in front of which is positioned a baffle 27 to prevent channelling and prevent any floating material flowing directly out of the opening 25 through which the treated water flows. Opening 25 leads to an effluent trough 28 which may be common with a plurality of settling tanks similar to the tank 20. The front wall 24 is provided with a central notch 29 with which is associated a weir 30 in front of which is a baffle plate 31 to prevent channelling, or short-circuiting, as hereinafter described. It may be stated that the front wall 24 of the settling or sedimentation tank 20 also forms the back wall of a flocculating tank 32 and that the weir 30 and baffle 31 are properly a part of the flocculator.

As best illustrated in Figs. 2, 4 and 5 of the drawings, I provide adjacent to the forward end of the settling tank 20 a sludge sump 33 which leads to a sludge hopper 34 (see Fig. 5) at one end thereof. Within the settling tank 20 is a scraper conveyor mechanism 35 provided with appropriate flights 36 which scrape settled solids or sludge along the bottom 23 of said settling tank 20 and discharge it into the sludge sump 33. Operating within the sludge sump 33 is another scraper conveyor 37 provided with flights 38 adapted to scrape the sludge along the bottom of the sump 33 and into the hopper 34. Associated with the sludge hopper 34 is a sludge pipe 39 which has a branch pipe 40 leading to a sludge well. The sludge collected in the hopper 34 is withdrawn therefrom either by hydrostatic pressure due to the liquid level in the settling tank 20 or is pumped therefrom in a well known manner. A single electric motor 41 is provided to drive the conveyors 35 and 37 through appropriate drive means 42.

As above set forth, the wall 24 is common with settling tank 20 and flocculator tank 32 which, in addition to said wall 24, is formed by a pair of spaced side walls 43, 43, bottom 44 and front wall 45, all of which are poured as a monolith of concrete with the above described settling tank 20. Front wall 45 is provided with an influent opening 46 in front of which is a baffle 47 to direct the influent solid bearing liquid from the influent trough 48 downwardly into said flocculator tank 32. The settling tank 20 and the flocculator tank 32 are placed end to end as may be seen by placing Figs. 1 and 2 end to end or Figs. 3 and 4 end to end.

In order to produce a flocculation of the solid particles of material contained in turbid water, sewage or industrial wastes, I introduce a coagulating reagent into the water to be treated. This reagent may be aluminum sulphate, lime, ferric sulphate or any other well known flocculating reagent. In order to derive the maximum economy from this reagent I divert a portion of the influent and mix it very thoroughly, as for example, in a flash mixer, with a concentrated solution of the reagent, thereby to form a dilute solution, which dilute solution is then introduced into the influent just prior to its introduction into the flocculator tank 32. To this end I provide a flash mixer comprising a container 49 formed of poured concrete as a monolith with the flocculator tank 32 and having an end wall 50, side walls 51, 51, front wall 52 and bottom 53. The end wall 50 is an integral portion of the influent trough 48 and is provided with a top opening 54 by which the dilute solution from the flash mixer 49 flows into the flowing liquid in the influent trough 48 and with it into the flocculator tank 32 by way of previously described influent opening 46.

To divert a portion of the influent liquid from the influent trough 48 I provide a by-pass pipe 55 in communication therewith and leading to a chamber 56 formed in the bottom 53 of the flash mixer 49. The front wall 52 of said flash mixer 49 is also provided with a conduit 57 which leads to said chamber 56. A valve 155 is provided to control the liquid flow through pipe 55.

Positioned adjacent to said flash mixer 49 and supported by framework 58 is a concentrated solution pot 59 in which a concentrated solution, which may be varied from 4% to 25% of coagulating reagent, is formed. The solution pot 59 is provided with a valve controlled drain 60 and a water inlet pipe 61 which is adjacent to the bottom thereof and leads thereto tangentially whereby the incoming water will have a circular motion to insure thorough mixing with the crystalline reagent, such as aluminum sulphate, lime, ferric sulphate, etc., which is fed to said pot 59. The pot 59 is also provided with an overflow chute 62 by which the concentrated liquid coagulating reagent is delivered to the conduit 57. Supported upon a small stand 63 is a feeder 64 preferably of the electro-magnetic vibratory type which will feed the crystalline reagent to the pot 59 at a variably controllable rate.

The flash mixer 49 is preferably provided with a cover 65, preferably made of boards, upon which is mounted an electric motor 66 which drives at a high speed a propeller 67 adjacent an opening between the flash mixer container and the chamber 56. This propeller 67 has a pump action to elevate the liquid level in flash mixer 49 and is effective to obtain a very thorough mixing of the concentrated solution of liquid coagulating reagent and water which flow into the chamber 56 and thence into the container 49 of said flash mixer. This provides for the making of a relatively dilute solution of coagulating reagent within said flash mixer, one which is found to be very satisfactory to produce coagulation and flocculation and ultimate settling of the solids found in the liquid.

It has been found that where a flocculator tank is made as a single compartment there is a tendency for some of the water to channel or short-circuit and flow directly from the inlet to the outlet and prevent a thorough agitation of the water, as a consequence of which the capacity of the flocculators must be made large to produce the required time interval of flocculation necessary to form flocks of the solid particles, particularly colloidal matter, in the water, which flocks after being formed will settle in a reasonable length of time in the settling tank. I have found that it is possible to reduce the size of both the settling tank and the flocculator by forming the flocculator into a plurality of compartments by providing a plurality of partitions 68 in the flocculator tank 32 and in the embodiment of the apparatus illustrated in Figs. 1, 2, 3 and 4 of the drawings, said tank 32 is formed into four compartments which I have found to be very satisfactory, though this number may be either increased or reduced. Said partitions 68 divide the flocculator tank 32 into compartments 69, 70, 71 and 72.

Within said compartments 69, 70, 71 and 72 I provide agitator mechanisms 73, 74, 75 and 76, respectively. The structures of the agitator mechanisms 73, 74, 75 and 76 are substantially the same except for differences hereinafter pointed out, and so a description of said mechanism 74, as illustrated in Fig. 7 of the drawings, will suffice for all of them. Said mechanism comprises a horizontal shaft 77 to which is connected a plurality of radially extending arms 78 carrying paddle boards or slats 79. It will be noted by reference to Figs. 1, 2, 3 and 4 of the drawings, that the horizontal shafts 77 of all of the agitators are in alignment and are coupled together by appropriate coupling units 80. Said shafts are also preferably supported by appropriate journals carried upon transversely extending beams, one of which is seen at 81 in Fig. 7 of the drawings. Said agitators 73, 74, 75 and 76 are driven from an electric motor 82 through a speed reducer 83 in chain and sprocket drive mechanism 84.

As illustrated in the drawings, the radial dimensions of the arms 78 of the several agitators 73 to 76, inclusive, decrease progressively from the compartments 69 to 72, inclusive. This provides for the most vigorous agitation in the compartment 69 with a progressive decreasing of agitation in subsequent compartments with a minimum of agitation in the compartment 72. The results are overlapping but apparently take place generally as follows. In compartment 69 the coagulating reagent is precipitated and the precipitate forms in small flakes or particles. The vigorous agitation insures the maximum precipitation in the minimum of time.

The precipitate in suspension in the liquid then flows into compartment 70 where precipitation continues and is largely concluded. The precipitate is here fairly vigorously agitated and coagulation takes place which is the attachment of the suspended solids to the individual precipitated particles.

It is desirable that substantially all the suspended solids become attached to a precipitated particle before ultimate flocculation begins which flocculation may be defined as the combination of a plurality of coagulated precipitated particles to which are attached solids previously individually suspended in the liquid. This fairly vigorous agitation insures contact between substantially all the suspended solids, and one or more precipitated particles with the ultimate adhesion or coagulation with one of them. It also prevents the formation of large flocks at this stage which if allowed would reduce the total exposed surface area of the precipitated particles with the result that all of the suspended solids would not adhere or coagulate with precipitated particles.

In the final compartments 71 and 72 flocculation takes place, with possibly an appreciable amount of coagulation in the former. In said compartments 71 and 72, particularly the latter, the coagulated precipitate, or adhering particles of precipitate and previously suspended solids, combine or adhere to form large flocks which will settle in a comparatively short time in the settling tank 20. The reduced agitation in compartments 71 and 72 causes contacting of the smaller flocks which then grow into larger flocks as the agitation is not severe enough to destroy the formed large flocks.

An important feature of construction of the flocculator is the formation of the partitions 68 and this is best seen by reference to Fig. 6 of the drawings. The only way fluid can flow from one compartment to the next, for example from compartment 69 to compartment 70, is through a restricted opening or conduit forming means 85 along the axis of rotation of the shaft 77 of the agitator mechanism. This structure is an important feature of my invention. It has been found from experimentation that this prevents channelling, or water short-circuits. As a consequence, substantially all of the water in any compartment remains therein the same length of time and consequently there is a maximum of the desired action in each compartment. This action apparently results due to the centrifugal forces tending to force the liquid solution away from the axis of rotation of the agitating mechanism, but without regard to the correctness of this theory, I have found the facts to be as above stated and experiments with the holes placed at many different positions establish that with the holes 85 at the axis of rotation of the agitating mechanism the retention period of all the liquid is a maximum in each compartment. This results in a substantial reduction in both the size of the flocculator tank and the settling tank for any given flow.

Each opening 85 is preferably made large enough so that the water velocity flowing through it will not result in a nozzle action in any compartment which would carry the liquid too far into the compartment before receiving any agitation. Also a high water velocity would tend to destroy any formed flocks which, if allowed to happen, would tend to negative the results achieved, particularly in the last two compartments.

In Fig. 8 of the drawings I have shown a modification of the opening in a partition 68 in that a square opening 86 is provided which may be also employed instead of the round or circular opening 85 illustrated in Fig. 6 of the drawings.

In the operation of the system or apparatus disclosed in Figs. 1 to 7, inclusive, of the drawings, with the consequent realization of the method of my invention, water or raw liquid to be treated for clarification flows in the influent trough 48 in the direction of the arrow (Fig. 1), and thence through the influent opening 46 into the first compartment 69 of the flocculator tank 32. A portion of the water to be treated is diverted from the trough 48 by way of pipe 55 and conveyed to chamber 56 at the bottom of flash mixer 49. A crystalline reagent, such as aluminum sulphate, lime, ferric sulphate, or the like, is fed by the feeder 64 at any desired controllable rate into the swirling water in the concentrated solution pot 59 where, due to the swirling action of the water, it is mixed thoroughly therewith to form a concentrated liquid coagulating reagent which then flows by way of overflow chute 62 from the pot 59 into the chamber 56 of the flash mixer by way of conduit 57. This concentrated solution of coagulating reagent is then thoroughly mixed by the agitator 67 with the by-passed water in the flash mixer from which it flows over the top by way of opening 54 into the influent stream with which it mixes and flows into said aforementioned compartment 69 by way of influent opening 46.

Within said compartment 69 the liquid, including a diluted solution of coagulating agent, is thoroughly agitated by the agitator mechanism 73 primarily to precipitate the coagulating reagent. This liquid, along with the precipitated reagent, then flows progressively through the compartments 70, 71 and 72 where the agitation is continued with progressively decreasing vigor, all the while the precipitating action of the coagulating reagent decreases and the formation and size of the flocks progressively increase so that as the liquid flows over the weir 30 of the compartment 72 and into the settling tank 20, substantially all of the solid particles in the raw material will be formed in flocks which will fall either directy into the sludge sump 33 or, after a period of time, will settle on the bottom of the settling tank 20 and will be conveyed by the scraper conveyor 35 to said sludge sump 33 from which it will be conveyed by the scraper conveyor 37 to the sludge hopper 34 from which it will, in turn, be removed by way of sludge pipes 39 and 40. The effluent liquid, free of solids, flows from tank 30 by way of opening 25 and trough 28.

It should be particularly noted that my improvements are particularly useful for the treatment of raw liquid having in suspension minute solid particles including colloidal matter that cannot be readily removed by sedimentation. The axial out-flow from one compartment to the next cooperates with the agitating mechanism not only to assure a homogeneous mixture of the coagulating reagent and liquid in each successive compartment, but also to assure a wide distribution of the flocks throughout the body of liquid to increase the building up of such flocks due to the agitation alone. That is to say, while the chemical action predominates in the formation of precipitate in the first compartment which progressively decreases in subsequent compartments, the mechanical agitation predominates in the building up of the flocks in the last compartment of the flocculator and is progressively less in preceding compartments. However, the arrangement for axial flow of the liquid from one compartment to the next increases not only the efficiency of the chemical treatment in the formation of the precipitate but also increases the efficiency of the mechanical agitation in the formation of flocks in each successive compartment.

In some instances, the chemical treatment may be entirely omitted and the apparatus used for progressively less agitation in the successive compartments in which event the formation of flocks and the building up of the same will be greatly facilitated by reason of the arrangement for axial flow of the liquid from one compartment to the next. In other words, an important feature of my invention is the retention of the body of liquid in each compartment for such distribution of the flocks therein as will render most efficient the mechanical agitation resulting in the formation and building up of such flocks. This is accomplished by the arrangement for horizontal axial flow from one compartment to the next as shown in Figs. 1, 3, 6 and 8.

As above set forth, the method and apparatus of my invention is very effective to maintain at a minimum the amount of coagulating reagent required due to the manner in which this coagulating reagent is formed before being fed to the flocculator. Furthermore, the manner of treating the raw liquid after the coagulating reagent has been added makes possible a much smaller size of flocculator tank and also a much smaller size of settling tank than has heretofore been required for the same flow.

In companion application for a Method of and apparatus for separating solids from liquids, Serial No. 195,608, of Richard D. Nichols, filed March 12, 1938, there is illustrated an improved method of and apparatus for producing flocculation which may also be employed to carry out the flocculation in the performance of the method of my invention and the flocculator apparatus disclosed in said application may also be substituted for the flocculator disclosed in the instant application.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. The method of flocculation which comprises subjecting a liquid flowing through a flocculator to a flocculating action in successive stages by subjecting the liquid to successive circular motions from an energy source independent of said liquid flow and about horizontal axes and confining the flow of liquid from one stage to the next substantially along the axis of rotation of the liquid and closely adjacent to such axis.

2. In liquid treating apparatus, the combination with a flocculator for treating liquid, of means for directing liquid to be treated into said flocculator, said flocculator comprising a plurality of compartments, rotary agitating means in each compartment for rotating the liquid therein on horizontal axes, and means for confining the feeding of the liquid from one compartment to the next substantially along the axis of rotation of said agitating means and closely adjacent to said axis of rotation.

3. A flocculator comprising the combination with a plurality of compartments, of rotary agitators in said compartments positioned to rotate on horizontal axes, means for rotating said agitators to effect rotation of the liquid in said compartments on such horizontal axes, and mechanism affording restricted openings for feeding liquid from one compartment to the next substantially only along the axes of rotation of said agitators and closely adjacent to such axes.

4. The method of flocculating liquid which comprises directing said liquid to flow successively through a plurality of compartments, rotating said liquid in each compartment about a horizontal axis from an energy source independent of said liquid flow, and confining the flow of the liquid from one compartment to the next to the axis of rotation of the liquid in the next compartment and closely adjacent to such axis of rotation.

SAMUEL L. TOLMAN.